W. M. WHITE.
METHOD OF INCREASING HEAD.
APPLICATION FILED JUNE 19, 1913.
1,273,558.
Patented July 23, 1918.
2 SHEETS—SHEET 1.
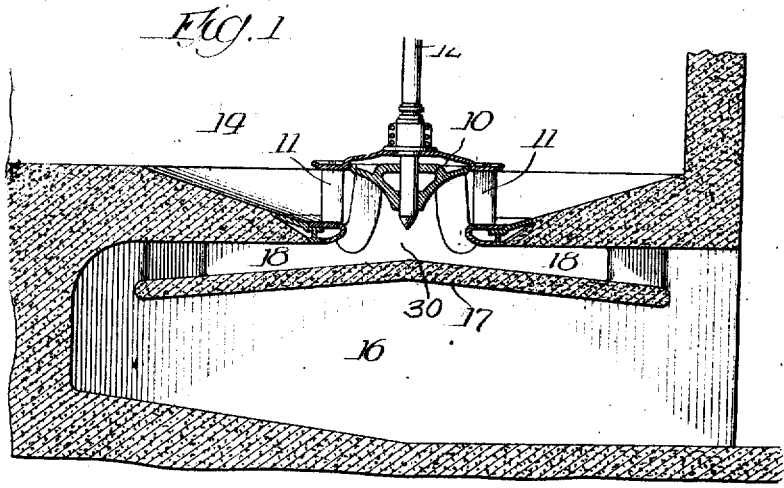
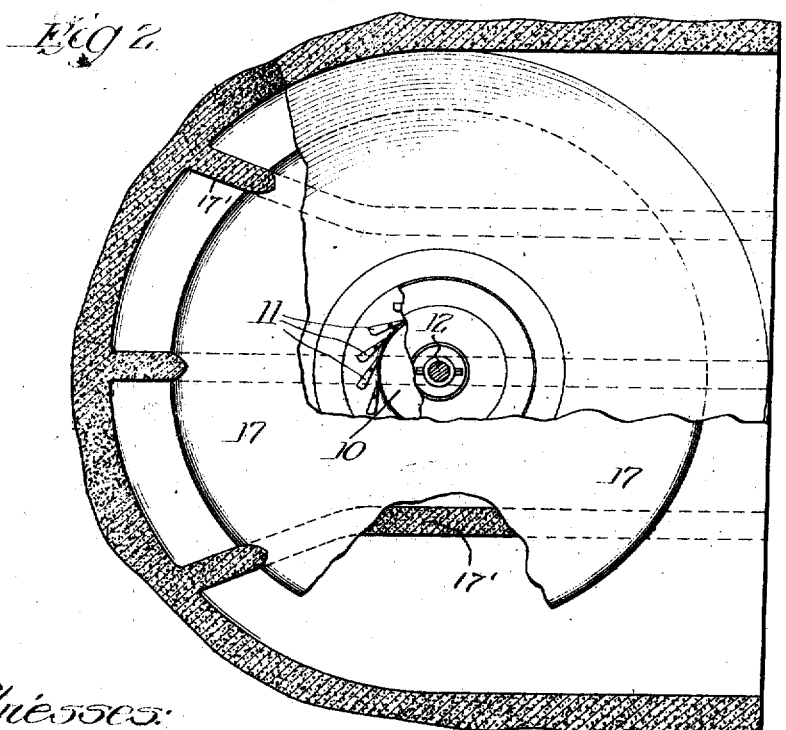

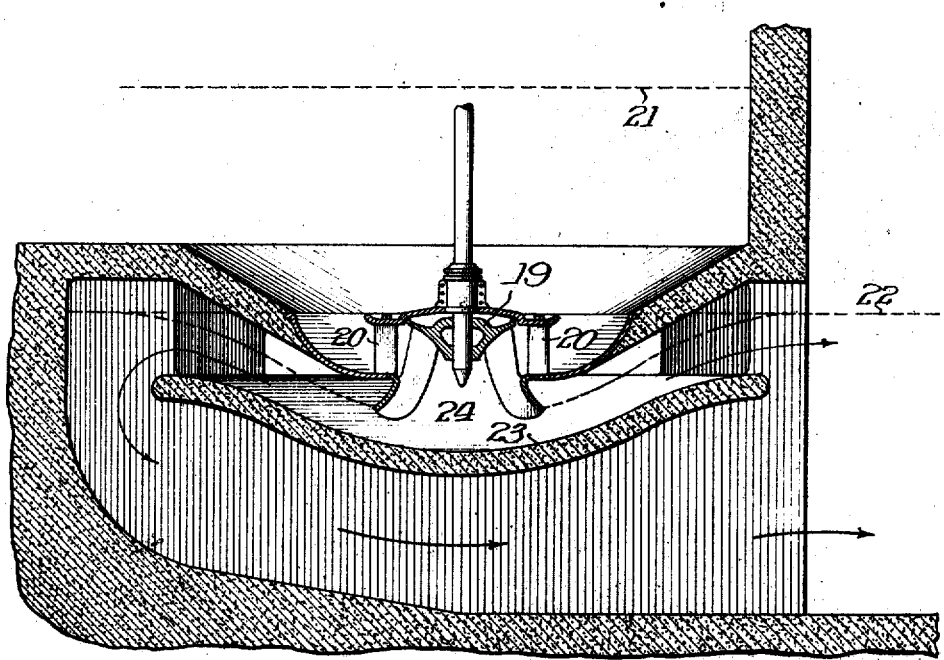

UNITED STATES PATENT OFFICE.

WILLIAM M. WHITE, OF MILWAUKEE, WISCONSIN.

METHOD OF INCREASING HEAD.

1,273,558.   Specification of Letters Patent.   Patented July 23, 1918.

Application filed June 19, 1913. Serial No. 774,528.

*To all whom it may concern:*

Be it known that I, WILLIAM M. WHITE, a citizen of the United States, residing at Milwaukee, in the county of Milwaukee and State of Wisconsin, have invented certain new and useful Improvements in Methods of Increasing Head, of which the following is a specification.

My invention relates to a method of increasing the effective head on a water wheel and contemplates the employment of apparatus similar to that described in my copending applications, Serial Nos. 769,790 and 769,791, filed May 26, 1913, and in my copending application #774,527, filed June 19, 1913. These applications show and claim structures of various forms by means of which the velocity of water discharged from a water wheel may be changed into pressure head with the greatest efficiency, some or all of the apparatus of such applications being adapted for use in carrying out the methods herein claimed.

A serious objection to the development of low water falls is the high cost of the machinery and plant as related to the productive capacity thereof. It is well known that the speed of a turbine varies as the square root of the head under which it is operating. Therefore under a low head the speed of the turbine is slow, requiring great size for the development of a given power. It is also well known that the cost of generators varies approximately inversely with their speed. Thus the large turbine at maximum efficiency and low speed generator necessary for the development of a low head will cost very much more than apparatus for the production of the same amount of power under a high head.

It is possible under my method herein disclosed to secure an effective head practically as great as desired, at the expense of an increased volume of water.

My invention contemplates, first the passing of an excess quantity of water through a water wheel greater than that required for maximum efficiency under the available fall, and utilizing some or all of the kinetic energy in the water flowing through the wheel to maintain a lower pressure in the draft chamber than is customary and thus increase the effective head of water acting on the wheel, and second as a specific means of accomplishing the above result operating the wheel at a greater speed than that required for maximum efficiency to create a whirling body of water at the discharge end of the wheel and changing velocity head of said whirling water into pressure head and thus increase the effective head of water on the wheel. The action of producing a flow through an orifice or opening, such as the opening between the vanes of a water wheel, greater than could be caused by the normal head acting thereon, by joining with said orifice a regaining conduit of increasing capacity in the direction of flow is explained on pages 186, 187 and 188 of "*Treatise on Hydraulics*" by Merriman, edition 1903, and a statement is made at the top of page 188 to the effect that the flow through the orifice of the regaining section was that due to a head five times greater than the actual head. Experiments which I have made give results comparable to those recited above. In carrying the method into effect I place the water wheel at the orifice mentioned above so that the discharge water will flow through the orifice and into the regaining section of increasing capacity in the direction of flow. In this way a portion of the energy of the water flowing through the turbine will be utilized by the wheel for the production of power and the remaining portion will be utilized in the regaining device or devices to increase the effective head acting on the turbine. The increased head will depend upon the amount of energy in the water which has passed by the turbine which, due to the action of the regainer above described, creates a lower pressure in the draft chamber than if such device were not employed and this causes a greater discharge of water through the orifice or the discharge end of the turbine than otherwise would obtain, whereby the effective head of water acting on and the speed of the turbine is increased under the available fall.

The device recorded by Merriman, referred to in the above quotation, converts the energy in the form of velocity through the orifice into pressure energy at the end of the tube of increasing capacity in the direction of flow with an efficiency of 84%.

One form of device for increasing head is a straight axis regaining tube, as described by Merriman. Another form which will also accomplish the purpose of my invention is hereinafter specifically described.

It is manifest that a portion of the head of any fall when utilized in the device above described will maintain the same relative properties of transformation and will accordingly maintain a lower pressure at the constricted portion of the device than at the discharge and thus increase the effective head upon the wheel.

The action of increasing head will be more readily understood by the use of a concrete example:

Let us assume that the passages of the water wheel are so related in connection with a passage of increasing capacity in the direction of flow or in connection with the devices herein more specifically described, so that the amount of energy carried by the water discharged from the water wheel runner will be 150% of the energy of that quantity of water which would flow under an unmodified head equal to the fall would have and discharge this energy into the small end of such passage of increasing capacity in the direction of flow, as mentioned.

Assume that the area of the discharge end of said passage of increasing capacity in the direction of flow is such that the velocity therethrough contains only 3% of the energy due to the fall, thus leaving 147% of the energy of that quantity of water which would flow under an unmodified head due to the fall would have to be converted from velocity into pressure within said passages.

On the basis of an efficiency of conversion of 80% for the said passage the pressure at the smaller end of said passage, or in other words, at the discharge of the runner which is connected to the small end of said passage, will be .8 of 147% or 117.6% of the pressure due to the fall less than the pressure at the discharge end of the passage, but the discharge end of said passage communicates with the tailrace to the surface of which the fall is measured, so that the head acting on the water wheel to cause flow thereto is 2.175 times the fall.

When the efficiency of conversion is 80% the energy lost is, consequently, 20% of the energy entering the smaller ends of said passages minus the energy discharged from said passages, or .20 times 147 or 29.4% of the energy due to the fall is wasted in maintaining a head on the water wheel of 2.17 times the fall.

The increased head acting on the water wheel is useful in maintaining a greater speed for given conditions of power and fall than has heretofore been obtained.

In these specifications the term fall is taken to mean the difference in elevation between the surface of the water above the dam and the surface of the water below the power plant under discussion.

My invention is an improvement over the existing suggested methods of increasing the head on water wheels. These existing methods contemplate using a portion of the stream flow which does not pass through the runner for the purpose of exhausting from the draft tube that portion of water which does pass through the runner, and delivering into a higher level tail water. These suggested methods depend upon the water ejector which has a very low efficiency. The best efficiency which I have been able to obtain from actual tests is about 10%, and although familiar with the art, I have not seen the results of any tests which show greater efficiency. These methods, on account of their low efficiency, use in the ejector many times the quantity of water flowing through the turbine, whereas in my invention I am using only a portion of the energy of the water which passes through the runner. In power plants where water is not valuable, the amount of machinery to handle the quantity required by the other suggested forms of increasers necessitates such large passages for handling this water that the cost is excessive.

The power developed by a given turbine varies as the three-halves power of the head and the speed varies as the square root of the head, so that in doubling the head on a given turbine we are able to obtain from it when operating at best efficiency nearly three times the power at the greater head than it will give at the smaller, and the speed for best efficiency at the higher head will be about 40% greater than its speed at best efficiency for the lower head. From this it will be seen that in a given installation with my head increaser maintaining double the head on the turbine, the cost of the water wheel machinery will be less per horse power what it would be in the former case. The cost of generators varies approximately inversely as their speed, so that by the use of the head increaser the cost of the hydro-electric machinery may be greatly reduced and this will permit the development of a great many low falls.

Another important application of my head increaser is in the case of varying fall on water power plants. The head may be materially reduced at times of flood due to the tail water backing up at a greater rate than the rise in the head water.

In a specific form my method may consist in maintaining within the space beneath the water wheel a whirling body of water which shall act on the discharge end of the water wheel and utilizing the centrifugal force of such whirling body of water to increase the effective head acting on the wheel. In order to maintain this whirling body of water I may utilize a head increaser such as heretofore referred to.

Given a design for maximum efficiency for the usual or normal fall, it is important to maintain the greatest power under low fall. To obtain the greater power under low fall I propose to use my head increaser located between the water wheel and tail race. In the design for maximum efficiency the water passages of the runner and guide vanes and also the speed of the runner are so related that there is minimum whirl in the draft chamber. Under this condition a minimum of energy is allowed to escape from the runner and consequently the head increaser is not called upon to transform any great amount of kinetic energy into potential energy, so that the loss in the head increaser is a negligible amount. Under this condition the head increaser is acting as a draft tube with even better efficiency than the usual draft tube.

When, however, the fall is reduced, the speed of the runner must be maintained normal and the fall is not great enough to cause flow enough through the runner to give radial out-flow, consequently there is now whirl and excess energy in the draft chamber. The head increaser will now transform this kinetic energy into potential energy and maintain a greater head on the turbine. This increased head causes increased flow through the runner with less whirl until the increase of head and decrease of whirl reaches a balance. This increased head with an efficient head increaser, increases the power of the turbine, so that there is obtained by my method a greater power in times of flood than has heretofore been obtained.

It is obvious that this whirl may be generated and maintained by the use of primary water from the head race. I do not consider this a desirable construction or method of operation as the total energy of such water would be lost in the process of increasing the head, none of the energy being utilized in the water wheel.

Apparatus by which my method may be carried out is shown in the accompanying drawings, in which, Figure 1 is a transverse section through a water wheel and head increaser, and, Fig. 2 is a plan view of the head increaser, parts being broken away to show the construction clearly.

Fig. 3 is a view similar to Fig. 1, illustrating in simple form the action of the whirling water whereby is secured the increase in effective head.

Referring more particularly to the drawings, it will be seen that in Fig. 1, I have shown a water wheel 10, and guide vanes 11, controlling the entrance of water to the wheel. Power is taken from the wheel by means of the shaft 12, directly connected to a generator not shown. The water is supplied to the wheel through a conduit 14, and is discharged therefrom through the water discharge passage 30 in the usual or well known manner.

In carrying out my invention, I employ a suitable space or chamber 16 below the water wheel, and I place therein a substantially horizontal deflector wall or partition 17 supported in any suitable manner, say for instance, upon piers 17′. Preferably this deflector is circular in shape, as well shown in Fig. 2 of the drawings, and its outer periphery terminates short of the upright walls of the chamber 16 so as to define an annular discharge passage for the water which passes through the space or conduit 18 defined by the deflector 17 and the top wall of the chamber 16. Inasmuch as the water discharging through the discharge passage 30 enters the space or conduit 18 at the center thereof and then flows radially in all directions through the conduit, it is apparent that this conduit 18 is of progressively increasing capacity from its center radially outward to the periphery of the deflector 17. This increase in capacity of the conduit 18 may be further increased by having the walls of the conduit diverge outward. For instance, in Fig. 1, the top wall of the chamber 16 is substantially horizontal, while the deflector or partition 17 is conical in cross section; i. e., the highest point of the upper face of the deflector 17 is at the center thereof from which said face inclines downwardly and outwardly in all directions, whereby the conduit 18 progressively increases in cross sectional area from its center outwardly.

Wherever the expression "axial discharge," or "axial discharge water wheel" is used, I mean a water wheel which is constructed so as to cause the water to discharge therefrom in an approximately axial direction; that is to say, substantially parallel to the axis of rotation of the wheel. One type of such form of wheel is shown in the accompanying drawings. In normal operation, according to the practice heretofore followed, sufficient water would be allowed to flow through the guide vanes 11, whereby the wheel would be operated most efficiently and under low heads this would result in a low speed with a consequent large size of water wheel. At slow speed a slow speed generator would be required and such generators are very costly. I propose, however, to provide a higher speed generator, allowing a large quantity of water to pass through the runner; that is to say, a larger quantity of water than could be used for the most efficient operation of the water wheel. Thus it follows that the water wheel would be operated at a high speed and a proportion of energy would pass through the runner and be wasted in the tail water. However, I propose to utilize this otherwise wasted energy by transforming the velocity of the water into pressure, whereby a much higher head is secured. This higher head in turn causes the operation of the water wheel at a much higher speed.

Although the construction shown in Fig. 3 is not preferable it will be described in order that the specific method referred to may be clearly understood. In such construction I provide a water wheel 19, having guide vanes 20. The level of the water in the head race is indicated at 21, and the level of the water in the tail race at 22. It will be noted that the bottom of the water wheel runner is considerably beneath the level of the water in the tail race. Beneath the water wheel I provide a concave deflector 23, whereby a space 24, of progressively increasing capacity is maintained thereabove, the outer edge of the deflector rising to a point near the level of the water in the tail race. By maintaining a whirl in the water discharged from the water wheel, the centrifugal force of the whirling water causes a vortex or area of low pressure at a point beneath the water wheel, this centrifugal action forcing the water to the higher level necessary to discharge it into the tail race. In this manner I am enabled to maintain an effective head on the water wheel equal to the distance from the top of the head water to the bottom of the water wheel, this distance being greater than the distance from the top of the head water to the top of the tail water. This construction thus described is illustrative only, the actual desirable construction being shown in Figs. 1 and 2. The same principle of operation is utilized although in such case the bottom of the water wheel is substantially on a level with the water in the tail race. The increased effective head is secured by maintaining a draft or suction beneath the water wheel whereby the same effect is secured.

Obviously much the same result might be secured by providing different or modified regaining or head increasing means in the draft tube. Neither would it be impossible to carry out my method by locating a well designed draft tube at the base of the turbine. My method is not limited therefore to any particular apparatus used in carrying it out.

I claim:

1. The method of operating water wheels which consists in passing an amount of water through a wheel in excess of the amount required for the maximum efficiency of the wheel under the available fall, and utilizing said excess water to produce an additional head acting on the water wheel.

2. The method of operating water wheels which consists in passing an amount of water through a wheel in excess of the amount required for the maximum efficiency of the wheel under the available fall, leading the discharge water in a direction approximately radial from the point of discharge, and utilizing said excess water to produce an additional head acting on the water wheel.

3. The method of operating water wheels which consists in passing an amount of water through a wheel in excess of the amount required for the maximum efficiency of the wheel under the available fall, leading the discharge water in all directions approximately radial from the point of discharge, and utilizing said excess water to produce an additional head acting on the water wheel.

4. The method of operating water wheels which consists in passing water through a wheel, leading the discharge water in a direction approximately radial from the point of the discharge, and permitting said water to expand during its radial discharge.

5. The method of operating water wheels which consists in passing water through a wheel, leading the discharge water in all directions approximately radial from the point of the discharge, and permitting said water to expand during its radial discharge.

6. The method of operating a water wheel which consists in passing an amount of water through the wheel by reason of excess speed in excess of the amount required for maximum efficiency of the wheel under the available head, and utilizing the increased whirling velocity of the water produced by the employment of an excess amount of water due to excess speed to provide an effective head greater than the effective head of said maximum efficiency operation of the wheel.

7. The method of operating a water wheel which consists in passing an amount of water through the wheel in excess of the amount required for maximum efficiency of the wheel under the available fall, and permitting the discharged water to expand in a substantially radially extending progressively increasing space to produce an effective head greater than the effective head of said maximum efficiency, substantially as described.

8. The method of increasing the effective head of water for utilization in water wheels, consisting in changing the kinetic energy in water discharged from a water wheel runner with a large tangential component into potential energy by passing the same through a passage of increasing capacity concentric with and expanding radially outward directly from the discharge of the runner whereby the potential energy at the end of the passage is increased, substantially as described.

9. The method of operating a water wheel, consisting in running said wheel at a speed in excess of that at which the wheel should be run to give its maximum efficiency at the head of water acting thereon, and due to such an excess in speed delivering to the shaft of said wheel only a portion of the energy of the water which would be delivered thereto by running the wheel at the speed of said maximum efficiency, changing the direction of flow of the discharged water from axial to substantially radial and utilizing the remaining energy of the water after passing through the wheel to produce in part the effective head of water acting on the wheel, substantially as described.

10. The method of operating a water wheel, consisting in running said wheel at a speed in excess of that at which the wheel should be run to give its maximum efficiency at the head of water acting thereon, and due to such excess in speed delivering to said water wheel only a portion of the energy of the water which would be delivered thereto by running the wheel at the speed of said maximum efficiency, changing the direction of the discharged water from axial to substantially radial, and converting the remaining kinetic energy in the water after passing through the wheel into potential energy to produce in part the effective head of water acting on the wheel, substantially as described.

11. The method of increasing the effective head of water for utilization for water wheels, which consists in passing through the wheel an amount of water in excess of that required to produce an energy corresponding to the maximum efficiency of the wheel under the available fall, regaining the excess energy by transforming the discharge velocity of the water into pressure head by permitting the water to expand in a progressively increasing space extending substantially radially in all directions from the axis of said runner, substantially as described.

12. The method of increasing the effective head of water for utilization for water wheels, which consists in passing through the wheel an amount of water in excess of that required to produce an energy corresponding to the maximum efficiency of the wheel, regaining the excess energy by transforming the discharge velocity of the water into pressure head, the velocity being transformed into pressure by permitting substantially radial flow of the water in all directions in a progressively increasing space, substantially as described.

13. The method of operating axial discharge water wheels which consists in utilizing the energy of whirling discharged water to produce an added head acting on the water wheel.

14. The method of securing an increased effective head on an axial discharge water wheel, which consists in utilizing for such purpose the centrifugal force of a whirling body of water at the discharge of the water wheel, substantially as described.

15. The method of increasing the effective head on an axial discharge water wheel, which consists in operating the wheel-runner at such a speed that a portion of the energy of the head is absorbed in producing a whirling motion in the discharged water, and utilizing the energy of such whirling water to increase the effective head acting on the wheel, substantially as described.

16. The method of increasing the effective head on an axial discharge water wheel, consisting in operating the wheel-runner at such a speed that a portion of the energy of the head is absorbed in producing a whirling motion in the discharged water, and utilizing the centrifugal force of such whirling discharged water to increase the effective head acting on the wheel, substantially as described.

17. The method of increasing the effective head on an axial discharge water wheel, consisting in maintaining a whirling body of water at the discharge of the water wheel, by discharging whirling water from the runner of the wheel into said body and utilizing the centrifugal force of such whirling discharge water to increase the effective head acting on the wheel, substantially as described.

18. The method of increasing the effective head on an axial discharge water wheel, which consists in forming a vortex at the discharge of the water wheel, said vortex being maintained by a whirling body of water, and utilizing the centrifugal force of such whirling body of water to increase the effective head acting on the wheel, substantially as described.

19. The method of increasing the effective head on an axial discharge water wheel, which consists in maintaining a vortex at the discharge of the wheel by delivering into said vortex the water from the runner with a large tangential component, and utilizing the energy of said water having a large tangential component to increase the effective head acting on the wheel, substantially as described.

20. The method of increasing the effective head on an axial discharge water wheel, which consists in maintaining a vortex at the discharge of a water wheel by changing the course of the discharge water from the runner from axial to substantially radial, and discharging into said vortex the water from the runner with a large tangential component and utilizing said water having a large tangential component to increase the effective head acting on the wheel, substantially as described.

WILLIAM M. WHITE.

Witnesses:
CHAS. F. MURRAY,
T. D. BUTLER.

It is hereby certified that in Letters Patent No. 1,273,558, granted July 23, 1918, upon the application of William M. White, of Milwaukee, Wisconsin, for an improvement in "Methods of Increasing Head," errors appears in the printed specification requiring correction as follows: Page 1, line 28, after the word "turbine" insert the words *at maximum efficiency;* same page, lines 35-36, strike out the words "at maximum efficiency"; and that the said Letters Patent should be read with these corrections therein that the same may conform to the record of the case in the Patent Office.

Signed and sealed this 27th day of August, A. D., 1918.

[SEAL.]

F. W. H. CLAY,
*Acting Commissioner of Patents.*

Cl. 253—122.